(12) United States Patent
Pourjavid

(10) Patent No.: US 6,529,622 B1
(45) Date of Patent: Mar. 4, 2003

(54) METHOD AND APPARATUS FOR IDENTIFYING DEFECTIVE REGIONS IN A DISCRETE PIXEL DETECTOR

(75) Inventor: Sussan Pourjavid, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/182,919

(22) Filed: Oct. 30, 1998

(51) Int. Cl.[7] .................................................. G06K 9/00
(52) U.S. Cl. ....................... 382/149; 382/219; 382/274; 250/370.09; 348/246
(58) Field of Search ................................. 382/149, 255, 382/254, 262, 263, 266, 270, 274, 275, 283, 132, 219; 250/208.1, 370.01, 370.09, 370.1, 366; 378/98.3, 98.12, 207; 348/246, 247

(56) References Cited

U.S. PATENT DOCUMENTS

| 4,748,507 A | * | 5/1988 | Gural ......................... 348/219 |
| 4,751,643 A | * | 6/1988 | Lorensen et al. ........... 378/901 |
| 5,120,950 A | * | 6/1992 | Roziere et al. ........... 250/208.1 |
| 5,325,198 A | | 6/1994 | Hartley et al. .............. 348/180 |
| 5,361,307 A | | 11/1994 | Hartley et al. ................. 382/1 |
| 5,517,234 A | * | 5/1996 | Gerber et al. ................ 348/126 |
| 5,617,461 A | * | 4/1997 | Schreiner .................... 378/98.5 |
| 5,657,400 A | * | 8/1997 | Granfors et al. ............. 382/254 |
| 5,712,890 A | * | 1/1998 | Spivey et al. .................. 378/37 |
| 5,778,044 A | * | 7/1998 | Bruijns ..................... 378/98.12 |
| 5,877,501 A | | 3/1999 | Ivan et al. ............. 250/370.09 |
| 5,982,921 A | * | 11/1999 | Alumot et al. .............. 382/145 |
| 6,028,314 A | * | 2/2000 | Finkler .................. 250/370.11 |
| 6,166,801 A | * | 12/2000 | Dishon et al. .............. 356/400 |

* cited by examiner

Primary Examiner—Bhavesh Mehta
Assistant Examiner—Sheela Chawan
(74) Attorney, Agent, or Firm—Fletcher, Yoder & Van Someren

(57) ABSTRACT

Potentially defective pixel regions of a discrete pixel detector are identified through analysis of a series of dark images and a series of exposed images. In the case of an x-ray system, the dark images are created with little or no radiation impacting the detector, while the exposed images are created with a uniform level of radiation over the detector surface. Output signals from the detector are averaged over the series of dark images, and over the series of exposed images. Analyses are performed on the average values to identify pixels producing inconsistent output signals, pixels producing output signals varying more than a desired amount from reference levels, and pixels producing output signals varying more than a desired amount from output signals of neighboring pixels. A mask is generated referencing the defective pixels for use in processing subsequent images.

33 Claims, 4 Drawing Sheets

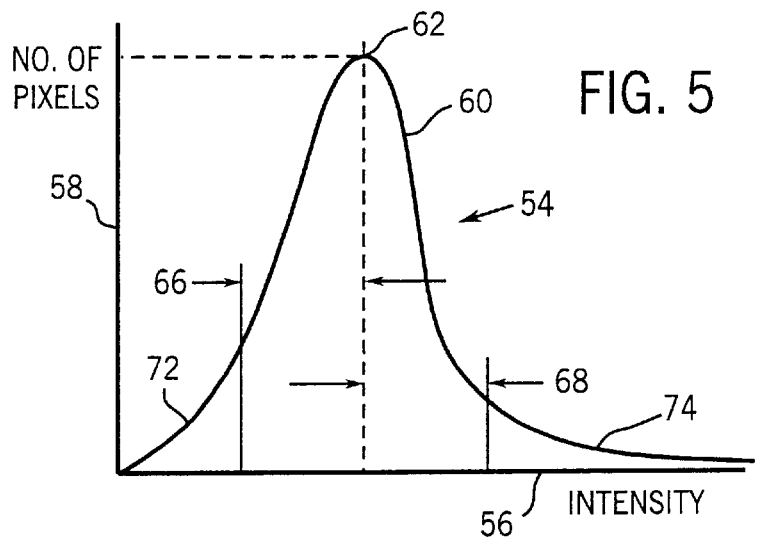
FIG. 5
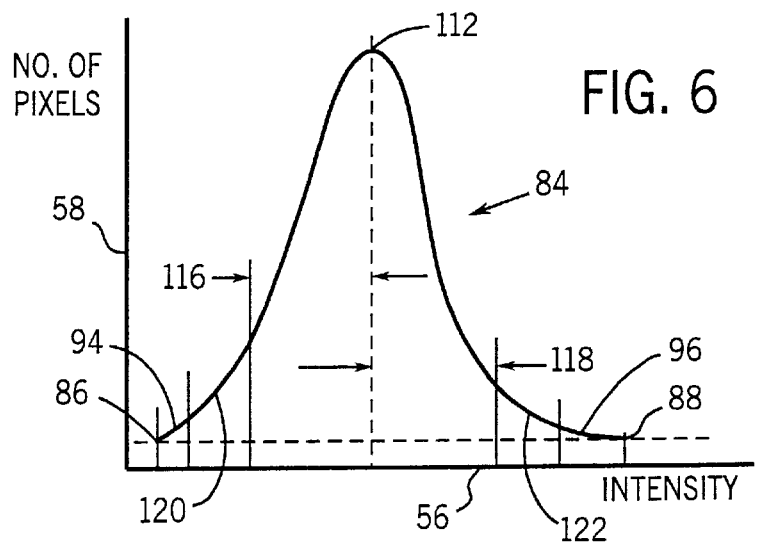
FIG. 6
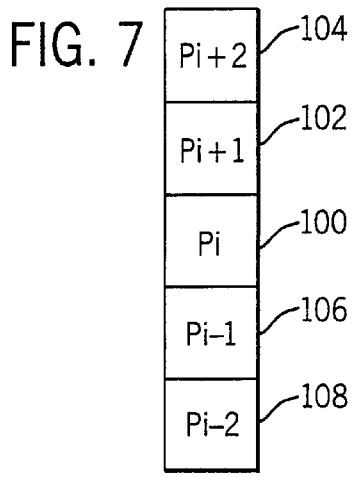
FIG. 7
FIG. 8

METHOD AND APPARATUS FOR IDENTIFYING DEFECTIVE REGIONS IN A DISCRETE PIXEL DETECTOR

TECHNICAL FIELD

The present invention relates to digital imaging and, more particularly, to a technique for identifying defective pixel regions in a digital image detector, such as detectors used in digital X-ray imaging systems.

BACKGROUND ART

Discrete pixel imaging systems, such as digital X-ray imaging systems, typically employ a detector for encoding information within specific picture element regions or pixels. In a digital X-ray system, for example, portions of a radiation stream emitted by an X-ray source penetrate a subject of interest and impact a detector placed adjacent to the subject. Based upon the structure and composition of the subject, varying amounts of radiation will impact the detector at the pixel locations. The detector is configured to generate output signals for each pixel location which are representative of the amount of radiation impacting the particular discrete regions defined by the pixels. These signals are then transmitted to processing circuitry for further conditioning, filtering and enhancement, eventually to be reconstituted into an overall image for use by an attending physician or radiologist.

In discrete pixel imaging detectors, such as those used in digital X-ray systems, it is not uncommon for detector output levels to vary between pixels, even when the pixels are exposed to equal levels of radiation. Such variations may be due to tolerances within the sensitivity of the detector itself, as well as to various forms of noise which may occur in the detection system. However, while certain normal variations may be permitted, significant differences in pixel-to-pixel output from the detector are not desirable.

Such pixel-to-pixel output variations may involve both underactive pixels (i.e., those regions producing a signal significantly lower than other regions for the same received radiation) and overactive pixels (i.e., regions producing output levels significantly higher than other regions for the same received radiation). In addition to producing erroneous dark or light artifacts in the resulting image, data from such underactive or overactive pixels can adversely affect signal processing operations performed on the image, such as adjustment of contrast and tone, as well as errors in dynamic range detection and image enhancement.

Defects in pixels in solid state detectors may result from various causes. For example, high leakage currents, open circuits and short circuits can cause pixels erroneously to output signals when no significant radiation levels have impacted their locations, or to output abnormally low signal levels when radiation has impacted the pixels. It would be useful, therefore, to identify potentially defective detector pixels so as to avoid erroneous data in discrete pixel images produced from the detector output. Where significant output differences are detected between pixels of a detector, it may be useful to flag such pixels as defective, and to manage information they provide in a special manner, or simply to disregard their output.

DISCLOSURE OF THE INVENTION

A technique is provided for identifying defective pixels in a discrete pixel detector, such as detectors used in X-ray imaging systems. In an exemplary embodiment of the invention, the technique subjects the detector to both dark and light image tests wherein a series of readings are obtained both in the absence of X-ray exposure and in the presence of uniform exposure over the matrix of pixels comprising the discrete pixel image. In the dark image sequence, noisy or overactive pixels are identified based upon statistical comparisons of the pixel output data. Pixels producing intensity values that fall outside a specified range are flagged as potentially defective. Underactive pixels are also identified in the dark image sequence. In the exposed image sequence, again both overactive and underactive pixels are identified which fall outside a desired deviation band. Moreover, pixels may be flagged as potentially defective if their output intensity value varies by more than a desired amount from an average value. Even where so identified, the pixels may be found to be acceptable through a local neighborhood comparison with values of pixels closely adjacent to the potentially defective pixel.

The technique provides an effective and efficient procedure for automatically identifying potentially defective pixels in detectors. The technique is particularly well-suited to quality control testing, as well as to calibration or installation verification tests of detectors in newly-installed and existing imaging systems. Based upon the results of the identification procedure, output signals from pixels identified as defective may be conditioned or disregarded by image processing circuitry to reduce or compensate for their presence in the detector. Moreover, the technique can be used to identify detectors which are acceptable for service, as well as detectors having unacceptable numbers of defective pixels, and which therefore should not be placed in service or should be removed from service.

BRIEF DESCRIPTION OF THE DRAWINGS

FIG. 5 is a histogram of pixel intensities analyzed during the dark image test sequence of FIG. 3;

FIG. 6 is a histogram of pixel intensities used to identify defective pixels during an exposed image test sequence of the type summarized in FIG. 4;

FIG. 7 is a pixel map used to evaluate deviations in signal levels between neighboring pixels in the test sequence of FIG. 4; and FIG. 8 is a pixel map illustrating pixels evaluated during a local neighborhood comparison phase of the test sequence of FIG. 4.

BEST MODE FOR CARRYING OUT THE INVENTION

Figure 1:
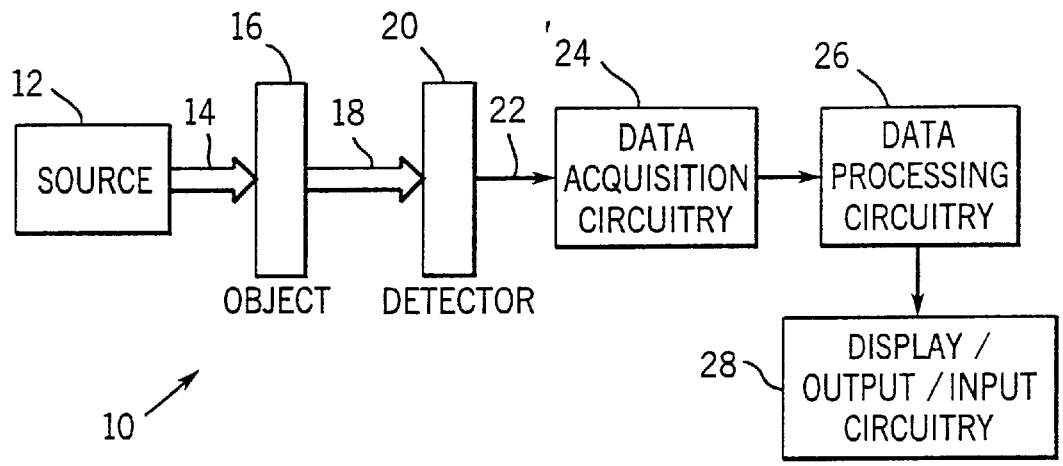
FIG. 1 is a diagrammatical representation of a digital imaging system including a detector for generating discrete pixel signals.

Referring now to FIG. 1, an imaging system is illustrated and designated by the reference numeral 10. Imaging system 10 includes a controllable radiation source 12, such as a source of X-ray radiation, capable of emitting a controlled stream of radiation 14 upon demand. The stream of radiation contacts an object or subject of interest 16, such as a human body, when positioned in the path of the stream. A portion 18 of the radiation traverses the object and impacts a discrete pixel detector 20. Detector 20 encodes digital signals representative of the radiation received within discrete pixel regions, and outputs a data stream 22 representative of the digitized values. This stream of digitized data is received by data acquisition circuitry 24 and is further processed, such as to normalize the data, adjust dynamic ranges over which the data extends, and so forth. The processed signals from data acquisition circuitry 24 is then transmitted to data processing circuitry 26. Data processing circuitry 26 further filters the data to enhance the discrete pixel image defined by the data for storage and subsequent display. Data processing circuitry 26 is coupled to display/output/input circuitry 28 for receiving configuration parameters, such as via a keyboard, and for outputting reconstituted images based upon signals produced by detector 20 and filtered by circuitry 24 and 26.

It should be noted that while in the present discussion reference is made to an X-ray imaging system, the techniques described herein for identifying potentially defective regions in a discrete pixel detector may be applied to other imaging modalities as well. It should also be noted that in the embodiment described, data processing circuitry 26, including associated memory circuitry for storing control routines and processed data, is embodied in a general purpose or application-specific programmable digital computer. As will be appreciated by those skilled in the art, alternative embodiments may include application-specific microprocessors used in conjunction with appropriate memory circuitry, analogy circuitry, and combinations of analog and digital circuitry. Similarly, display/output/input circuitry 28 may include conventional operator keyboards, monitors, printers, and so forth.

Figure 2:
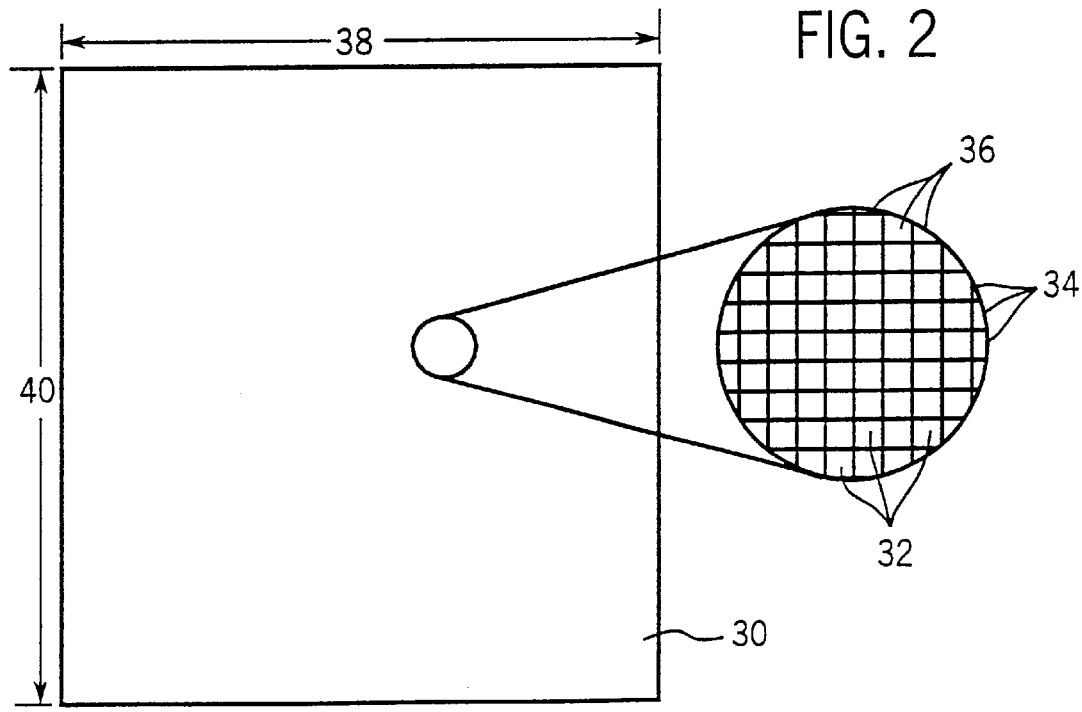
FIG. 2 is a elevational view of a sensing face of a detector including a matrix of discrete pixels which may be tested in accordance with the present technique.

Detector 20 is configured with a detecting surface or face for producing discrete pixel signals forming a matrix of pixel locations as illustrated in FIG. 2. The discrete pixel matrix 30 comprises a plurality of pixel regions 32 arranged in adjacent rows 34 and columns 36. The rows and columns of pixels thus define an image matrix having a predetermined width 38 and height 40 measured as an integer multiple of the pixels comprising the matrix. For example, in X-ray applications matrix 30 may have pixel dimensions of 1,024×1,024 pixels. As will be appreciated by those skilled in the art, a variety of matrix dimensions may be employed, depending upon such factors as the subject to the imaged, the features of interest, and the resolution desired.

Figure 3:
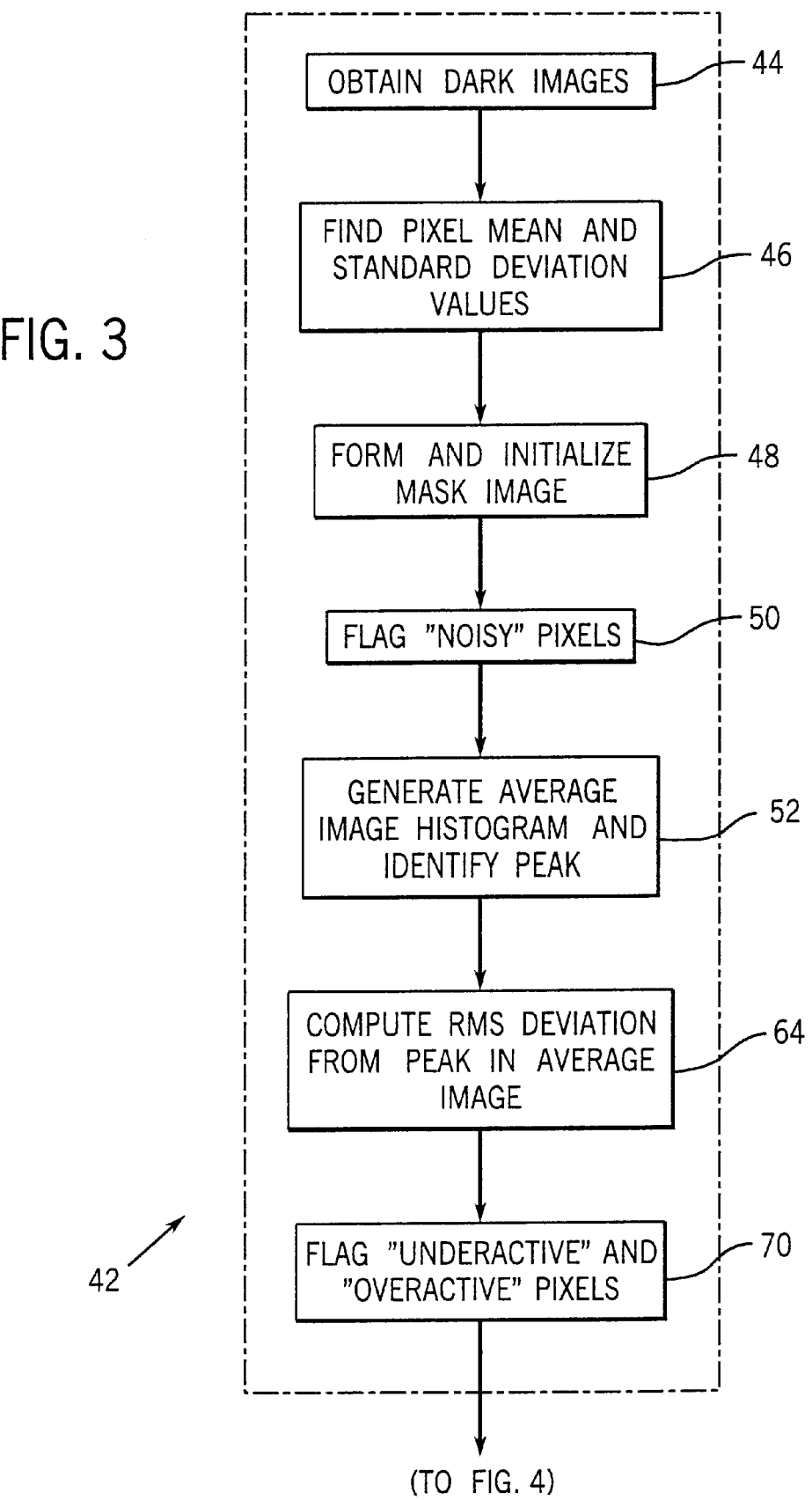
FIG. 3 is a block diagram representing exemplary steps in control logic for identifying defective pixels in a detector during a dark image test sequence.
Figure 4:
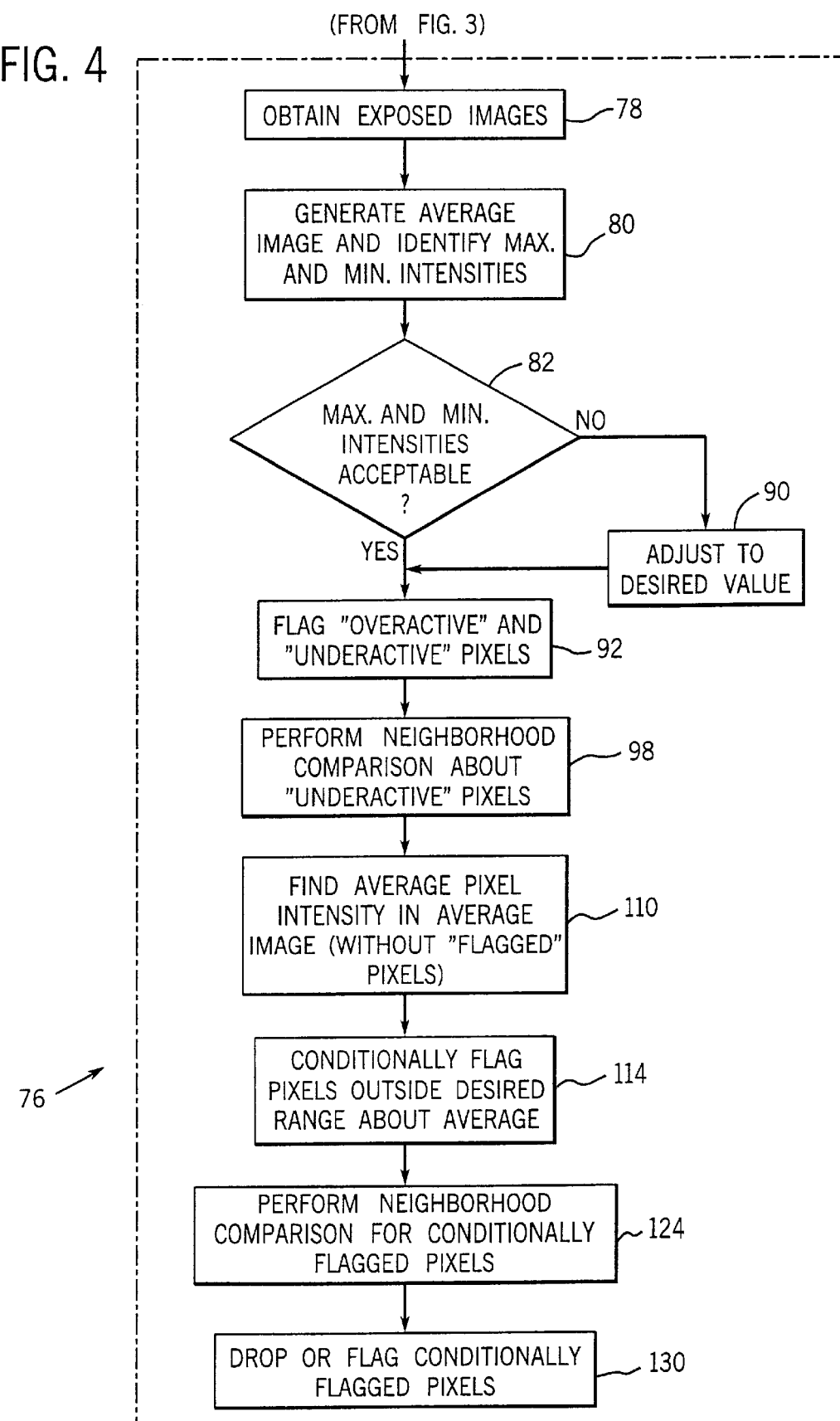
FIG. 4 is a block diagram of steps in exemplary control logic for identifying defective pixels in a detector during an exposed image test sequence.

In operation, signals encoded by detector 20 and processed by circuitry 24 and 26 are typically representative of intensity of radiation received within each discrete pixel region. However, specific pixel regions of detector 20, and associated circuitry contained within detector 20 may cause signals to be transmitted from the detector which are erroneous in nature. Specifically, such signals may indicate that the pixel region has received radiation above actual received levels, or has not received radiation although such radiation has impacted the region. In addition, regions of detector 20 may produce unreliable or inconsistent output signals. The presence of such erroneous signals in the acquired data may cause circuitry 24 and 26 to erroneously process the collection of pixel data defining the image, and therefore result in unsatisfactory final images. FIGS. 3 and 4 represent steps in exemplary control logic for identifying such defective regions. Specifically, FIG. 3 represents steps in exemplary control logic for identifying defective pixel regions through a series of dark images, while FIG. 4 represents steps in control logic for identifying defective pixels through a series of exposed images.

Referring now to FIG. 3, the dark image detection sequence 42 begins at step 44 where a series of dark images are obtained. In this step, data processing circuit 26 obtains output from detector 20 through data acquisition circuitry 24 for a series of images created with little or no radiation being emitted from source 12, and with no object 16 placed intermediate the source and the detector. In the present embodiment, at least 32 frames of dark images are obtained in this fashion. Because the images are obtained in the absence of exposure, an ideal detector would produce output signals for each pixel region having values or levels substantially equal to zero or some base minimum value. However, due to offsets for diode leakage current, FET charge retention, and so forth, pixel regions of detector 20 will typically produce output signals having some level other than zero. Moreover, these offsets may vary from pixel to pixel due to non-uniformity in manufacturing processes and owing to the nature of the detector readout. Similarly, the offset for any given pixel may vary over time. Thus, at step 44, the series of dark images permits such variations to be statistically accounted for.

At step 46, data processing circuitry 26 computes the mean and standard deviation for each pixel through the series of dark images. The mean and standard deviation values for each pixel are saved in memory circuitry associated with data processing circuitry 26. At step 48, a mask image $M(x_i, y_i)$ is formed having the same number of pixels and dimensions as the dark images produced at step 44. The value of each pixel in the mask image are initialized to a default value, such as zero. As will be appreciated by those skilled in the art, the mask image is preferably defined by memory locations and contents, and need not be physically perceivable in an output display format. The mask image will serve through the following steps to flag potentially defective pixel regions.

At step 50, "noisy" pixels, or pixels producing inconsistent output signals, are flagged as follows. First, the standard deviations computed at step 46 for each pixel in the series of dark images are compared to upper and lower allowable standard deviation values. The particular upper and lower threshold values used in this step may be set based upon the desired tolerance for the particular detector, such as several standard deviations. The upper standard deviation threshold au represents the maximum allowable deviation above the pixel mean level, while the lower threshold $\sigma_l$ represents the maximum allowable deviation below the pixel mean level. If at step 50, the standard deviation for an individual pixel is found to exceed either of the allowable standard deviation thresholds $\sigma_u$ and $\sigma_l$, the corresponding pixel value in the mask image $M(x_i, y_i)$ is changed from zero to a flag value such as −3. It should be noted, however, that the actual values for the upper and lower acceptable standard deviation thresholds may vary depending upon the detector model. In addition, as noted above, these values will typically be set for each detector model based upon the matrix size, manufacturing tolerances, and so forth.

At step 52, processing circuitry 26 generates an average image histogram and identifies a peak or reference intensity level from the histogram. A histogram of the type generated at step 52 is illustrated in FIG. 5 and designated generally by reference numeral 54. Graphically illustrated, the histogram 54 is a bar plot of specific intensity values arranged in ascending order along a horizontal axis 56, and discrete population counts for pixels having mean values equal to the intensity values along a vertical axis 58. The population counts for each intensity value form a stepwise function which may be represented as a generally smooth curve 60. As will be appreciated by those skilled in the art, the graphical representation of FIG. 5 need not be actually generated in the defective pixel identification process, but may be defined by values stored in memory circuitry associating specific intensity values with specific pixel counts.

A peak intensity value 62 is identified by locating the maximum population count along the histogram curve 60 and noting the intensity value corresponding to this maximum pixel count, denoted $I(H_{max})$. Next, at step 64, the root mean squared deviation between the mean values identified at step 46 and the intensity of the maximum population $I(H_{max})$ is computed from the relationship:

$$m_{rms} = (\Sigma(m(x_i, y_i) - I(H_{max}))^2 / N^2)^{1/2}$$

where $m_{rms}$ is the RMS deviation, $m(x_i, y_i)$ is the mean value for the individual pixels through the series of dark images, and N is the number of pixels included in the summation. For this calculation only pixel values having a mean less than or equal to a load zero value for the detector are considered. As will be appreciated by those skilled in the art, such load zero values will generally be known for the detectors being evaluated, and represent a maximum allowed offset value from an anticipated dynamic range of pixel intensities. For example, in a 12 bit dynamic range, a load zero value of 3 bits may be typical.

Based upon the resulting RMS deviation value, underactive and overactive pixels are identified at step 70 as follows. First, pixels having an average intensity value greater than the load zero value are identified and flagged by changing a corresponding value saved in the mask image $M(x_i, y_i)$ to a flag value, such as −3. Similarly, values in the mask image are changed to the flag value for pixels satisfying the following relationships:

$$m(x_i, y_i) \leq I(H_{max}) - n_l m_{rms}; \text{ or}$$

$$m(x_i, y_i) \geq I(H_{max}) + n_u m_{rms};$$

where $n_l$ and $n_u$ are lower and upper coefficients for corresponding upper and lower multiples of standard deviations to the left and to the right, respectively, of the intensity of the maximum pixel count $I(H_{max})$. In the present embodiment, for example, a lower standard deviation multiple of 2 may be employed, while an upper standard deviation multiple of 3 may be used. It should be noted, however, that the coefficients $n_l$ and $n_u$ need not be integer values. The comparisons made at step 70 thus determine whether mean pixel intensity values resulting from the dark image sequence fall within a range defined by a lower acceptable intensity band $(I(H_{max}) - n_l m_{rms})$, as indicated by reference numeral 66 in FIG. 5, and an upper acceptable intensity band $(I(H_{max}) - n_u m_{rms})$, as indicated by reference numeral 68 in FIG. 5. The result of the comparisons is to flag underactive pixels within a lower range indicated by reference numeral 72 in FIG. 5 and overactive pixels falling within an upper range as indicated by reference numeral 74 in FIG. 5.

Through the foregoing steps, the resulting values contained in the mask image $M(x_i, y_i)$ provide an indication of defective pixels identified through the dark image sequence. Specifically, pixels having values of zero in the mask are considered acceptable, while pixels having values equal to the flag value in the mask, such as −3, are considered defective. Following the dark image test sequence summarized above, data processing circuitry 26 executes the exposed image test sequence summarized in FIG. 4.

Referring now to FIG. 4, the exposed image test sequence, designated generally by the reference numeral 76, begins at step 78 where a series of exposed images are obtained. These images are preferably obtained by irradiating the detector with a high exposure without saturating the detector, and at a long source-to-detector distance. For an ideal detector and X-ray source, the measured intensity at all pixel locations would be equivalent except for clear distinctions due to inactive pixels. In practice, however, the resulting images produce an intensity distribution which is analyzed as summarized below to identify potentially defective pixels. In the present embodiment 16 exposed images are obtained and the output signals from the images are offset-corrected in a conventional manner.

At step 80, an average exposed image, denoted $E(x_i, y_i)$ is generated by averaging output values for each pixel in the 16 images. The maximum and minimum intensity values $E_{max}$ and $E_{min}$ are then identified from the average image and their corresponding populations are counted and denoted $NE_{max}$ and $NE_{min}$, respectively.

At step 82, the maximum and minimum intensities are reviewed to determine whether they are acceptable as boundaries for elimination of defective pixels. In particular, because subsequent comparisons to identify overactive and underactive pixels will be based upon a range of acceptability, it is desirable to determine whether the value of $E_{min}$ is equal to a zero intensity value, or whether the identified value of $E_{max}$ is less than a saturation value. In the former case, a lower bound of a desired intensity range would be caused to equal zero, considered to be an overly restrictive criterion. In the latter case, an upper bound for the desired intensity range will become too low, potentially causing acceptable or functional pixels to be flagged as defective. Accordingly, a comparison is made between the minimum average intensity value as follows:

$$E_{min} = 0; \text{ or}$$

$$(1 + \beta_l) E_{min} < (E_{min})_T$$

where the value $\beta_l$ is a percentage of the intensity range, and $(E_{min})_T$ is an absolute minimum threshold set empirically for the particular detector. If either of these conditions if found to be true, the value of $(1 + \beta_l) E_{min}$ is set to the value of $(E_{min})_T$ for use in the following step in the process, as indicated at step 90 in FIG. 4.

Similarly, the value of $E_{max}$ is evaluated by the following comparison:

$$E_{max} < \text{saturation; or}$$

$$(1 + \beta_u) E_{max} < (E_{max})_T$$

where the value for saturation is the saturation value for the detector being tested, $\beta_u$ is the proportion of the intensity range, and $(E_{max})_T$ is an absolute maximum threshold. If either of these conditions if found to be true, the value of $(1 + \beta_u) E_{max}$ is set equal to $(E_{max})_T$ for use in the following step in the evaluation sequence. As indicated at step 90 in FIG. 4. It should be noted that any suitable values for $\beta_l$ and $\beta_u$ may be used. In the present embodiment value of 10% is used for both parameters.

The analysis performed through these steps is illustrated graphically in FIG. 6. FIG. 6 represents a histogram 84 similar to histogram 54 of FIG. 5, but generated based upon the average intensity values determined in the exposed image sequence. The foregoing comparisons made at step 82 effectively establish a minimum reference value 86 and a maximum reference value 88 for subsequent evaluation of the pixel outputs.

At step 92, overactive and underactive pixels are flagged as follows. Firstly, it is determined whether the counts of minimum and maximum average pixel intensities are within predetermined ranges in accordance with the following comparisons.

$$NE_{max} < a_u N_{total}; \text{ and}$$

$$NE_{min} < a_l N_{total}$$

where the values $a_u$ and $a_l$ are fractions of the total number of pixels $N_{total}$. In the present embodiment, values of 1 percent are used for the upper and lower fractional intensity coefficients $a_u$ and $a_l$. If the value $NE_{min}$ is found to be less than the value $a_l N_{total}$, any pixel with an average intensity value equal to or less than the value $(1+\beta_l) E_{min}$ is set equal to conditional flag value, such as −2 in the mask image $M(x_i, y_i)$. As noted above, the value of the quantity $(1+\beta_l) E_{min}$ will have been adjusted, if necessary, through steps 82 and 90 as summarized above. Moreover, if the value $NE_{max}$ is found to be less than the value $a_u N_{total}$, any pixel having an intensity value equal to or greater than the value $(1+\beta_l) E_{max}$ is set equal to a flag value such as −3 in the mask image. Again, the value $(1+\beta_u) E_{max}$ will have been adjusted, if necessary, through steps 82 and 90 above. If the comparison of the values $NE_{min}$ and $NE_{max}$ are negative, the flagging of pixels in this step is not performed, and the routine proceeds to step 98, summarized below.

The results of the comparison and flagging performed at step 92 are illustrated in FIG. 6. Specifically, by application of the lower intensity value test, underactive pixels within a lower range 94 may be identified and flagged as defective. Similarly, by application of the upper intensity value test, overactive pixels within a band 96 may be identified and flagged.

Following the foregoing analysis, a neighborhood comparison is performed as indicated at step 98 for underactive pixels identified by the flag value −2 in the mask image as set at step 92. Because output signals from discrete pixel detectors are commonly read out in patterns following columns or rows of the image matrix, it has been found that underactive pixels may cause adjacent pixels to produce erroneous output values. Accordingly, at step 98, pixels flagged as underactive in step 92 are analyzed further to determine whether they are adversely affecting neighboring pixels in the matrix. FIG. 7 illustrates a present approach for performing this neighborhood comparison.

As illustrated in FIG. 7, each pixel receiving a conditional flag value at step 92, such as a value of −2 in the mask image, is considered at a central position 100, as indicated by the nomenclature $P_i$ in FIG. 7. The two immediately upwardly adjacent pixels in the corresponding column, denoted 102 and 104 in FIG. 7, are then compared with one another to determine whether their average intensities through the series of exposed images are within a desired range of one another. If this is not the case, the pixel immediately adjacent to the conditionally flagged pixel is flagged as defective, receiving a flag value, such as −3, in the mask image. Similarly, the two pixels immediately below the conditionally flagged pixel, denoted 106 and 108 in FIG. 7, are compared to one another to determine whether their average intensity values through the series of exposed images are within a desired range of one another. If this is not the case, the immediately adjacent pixel to the conditionally flagged pixel if flagged as defective by assigning a flag value of −3 to that pixel in the mask image. In either case, if the two adjacent pixels are found to be within the desired range of one another, neither pixel is flagged as defective. Following these comparisons, the conditionally flagged pixel is permanently flagged with a value of −3. It should be noted that where other signal read out patterns are employed, such as row-by-row read outs, this neighborhood comparison step would be performed in the direction of the anticipated errors (e.g., following the row direction).

Following step 92, the average pixel intensity in the average image $E(x_i, y_i)$ is calculated as indicated at step 110. In this process, only pixels not flagged as defective by a value of −3 in the mask image are considered. The average pixel intensity is represented by dashed line 112 in FIG. 6.

In step 114, pixels having average intensity values outside a desired range about the average intensity 112 are conditionally flagged. In the present embodiment, this conditional flagging step is performed by applying the following tests:

$$E(x_i, y_i) < (1-\delta) E_{av}; \text{ or}$$

$$E(x_i, y_i) > (1+\delta) E_{av}$$

where $E(x_i, y_i)$ is the average value for each pixel throughout the exposed image sequence, δ is a desired range about the average intensity value, and $E_{av}$ is the average intensity value, represented by line 112 in FIG. 6. Again, this comparison is performed only for pixels not having a value of −3 in the mask image. The value δ is preferably set to establish a range of acceptable deviation from the average intensity value. For example, in the present embodiment, a value of 30 to 40 percent may be set. Other values may be used depending upon the type of detector and the tolerance desired. The comparisons performed during the step effectively establish upper and lower ranges 116 and 118 in FIG. 6, within which the average pixel intensity values should fall. For pixels not falling within this range (i.e., satisfying the conditions of the comparisons) a conditional flag value of −1 is set in the mask image.

Because variations causing pixels to fall outside the desired range may result from source-dependent variations, a neighborhood comparison step is performed on the conditionally-flagged pixels, as indicated at step 124 in FIG. 4, to isolate effects of such variations. In this search, pixels within the neighborhood of each pixel receiving a conditional flag value are compared to the conditionally flagged pixel as indicated in FIG. 8. In the present embodiment, a neighborhood 126 is defined wherein the conditionally flagged pixel 128 is located in a central position. If the conditionally flagged pixel varies more than a specified fraction, such as 30 percent in average intensity value from its horizontal and vertical neighbors, a subsequent comparison is made. In the present embodiment each conditionally flagged pixel is compared to two upper and two lower neighboring pixels, and to two pixels to the right and to the left of its location. In this comparison, only pixels having a value other than −3 in the mask image are compared to the conditionally flagged pixel. If the results of the horizontal and vertical direction comparisons indicate that the difference between the average values is greater than the desired value, a diagonal comparison is performed, wherein the conditionally flagged pixel is compared to two pixels to the upper right, lower right, upper left and lower left of its position. If the results of this test also indicates that the pixel value varies by more than the desired amount from its neighbors, the conditionally flagged pixel is permanently flagged as defective by changing the conditional flag of −1 in the mask image to a flag value of −3. This final flagging procedure is indicated at step 130 in FIG. 4. Conversely, pixels which have been conditionally flagged at step 114, but which do not differ by more than the desired amount from its neighbors determined through the comparisons at step 124 are indicated as acceptable by changing their conditional flag value of −1 in the mask image to an acceptable value of zero. As will be appreciated by those skilled in the art, various alternative approaches may be envisioned to the foregoing to identify source-dependent variations within specific detector neighborhoods.

Through the foregoing neighborhood comparison, radiation drop off and center-to-edge non-uniformities in the detector panel due to manufacturing processes and the like may be accounted for by dividing the panel into zones. Specifically, in the present embodiment a central zone including 75% of the panel pixels is distinguished from an outer zone including 25% of the pixels surrounding the central zone. The permitted variations between the pixels in the two zones in the neighborhood comparison are modified to permit greater deviation between pixels in the outer zone as compared to pixels within the central zone.

As will be apparent to those skilled in the art, the foregoing test sequences result in a mask image wherein potentially defective pixels are flagged by values of −3 while acceptable pixels retain a default value of zero. The mask image may be then used as a reference for determining whether the detector should be placed in service, or whether, once in service, the detector should be replaced. The mask image map may also be used to account for discrepancies in pixel output, such as by correcting for output signals from defective pixels, disregarding such output signals or filtering or enhancing the reconstructive image in way to mask the defective regions. In the latter case, the mask image is stored in memory circuitry associated with signal processing circuitry 26, such as in the form of a lookup table. When detector 20 is subsequently used to produce output signals for generating an image of an object of interest, the mask image is accessed by signal processing circuitry 26, and the values stored in the table are referenced, such as to cause the signal processing circuitry to disregard output from defective pixels in at least a portion of the image processing and reconstruction.

What is claimed is:

1. A method for identifying defective pixel regions of a discrete pixel x-ray detector, the method comprising the steps of:
   (a) generating a plurality of first signals based upon output by the x-ray detector representative of each pixel region in a series of dark images by averaging first output signals for each pixel over the series of dark images;
   (b) comparing the averaged first signals to first desired parameter values derived from the first output signals to identify a first set of defective pixel regions;
   (c) generating a plurality of second signals based upon output by the x-ray detector representative of each pixel region in a series of exposed images by averaging second output signals for each pixel over the series of exposed images; and
   (d) comparing the averaged second signals to second desired parameter values derived from the second output signals to identify a second set of defective pixel regions.

2. The method of claim 1, wherein the first signals are generated by averaging output values for each pixel region over the series of dark images, and the second signals are generated by averaging output values for each pixel over the series of exposed images.

3. The method of claim 1, wherein at least one of the first desired parameter values is a statistical value generated based upon the first signals and at lease one of the second desired parameter values is a statistical value generated based upon the second signals.

4. The method of claim 1, including the further step of generating a defective pixel region mask in which defective pixel regions are differentiated from acceptable pixels.

5. The method of claim 1, including the step of performing a local neighborhood comparison wherein signals for potentially defective pixel regions are compared to signals for pixel regions within local neighborhoods surrounding the potentially defective pixel regions.

6. The method of claim 5, wherein signals for potentially defective pixel regions satisfying a desired relationship to signals for pixel regions within a local neighborhood are identified as acceptable.

7. The method of claim 5, including the step of conditionally identifying pixel regions as defective based upon a comparison of signals representative of the pixel regions to desired parameter values, and wherein the local neighborhood comparison is performed only for pixel regions identified as conditionally defective.

8. The method of claim 1, including the step of comparing signals representative of pixel regions adjacent to defective pixel regions to one another and identifying adjacent pixel regions as defective when the signals differ from one another by more than a desired amount.

9. The method of claim 8, wherein the adjacent pixel regions are selected following a direction of read out of output signals from the detector.

10. A method for identifying potentially defective pixels in a digital x-ray detector, the method comprising the steps of:
    (a) executing a dark image test sequence by creating a series of dark images at a first x-ray radiation level, computing average signal levels by averaging output signals for each pixel over the series of dark images, and analyzing the average signal levels with respect to parameter values derived from the output signals over the series of dark images to identify potentially defective pixels;
    (b) executing an exposed image test sequence by creating a series of exposed images at a second x-ray radiation level higher than the first level; computing average signal levels by averaging output signals for each pixel over the series of exposed images, and analyzing the average signal levels with respect to parameter values derived from the output signals over the series of exposed images to identify potentially defective pixels; and
    (c) generating a mask referencing the potentially defective pixels identified through the dark and exposed image test sequences.

11. The method of claim 10, wherein the analysis performed in step (a) includes identifying deviation of signals from each pixel from an average signal level for the respective pixel over the series of dark images, and identifying the respective pixel as potentially defective when the deviation exceeds a desired value.

12. The method of claim 10, wherein the analysis performed in step (a) includes identifying a reference intensity level from the average signal levels, comparing the average signal levels to the reference intensity level, and identifying a pixel as potentially defective when its average signal level deviates from the reference intensity level by more than a desired amount.

13. The method of claim 12, wherein the reference intensity level is determined by identifying a peak of an intensity histogram generated from the average signal levels.

14. The method of claim 10, wherein the analysis performed in step (b) includes identifying minimum and maximum intensity levels from the average signal levels, and identifying as potentially defective pixels having average signal levels deviating from the minimum and maximum intensity levels by more than a desired amount.

15. The method of claim 10, wherein the analysis performed in step (b) includes performing a local neighborhood comparison wherein signals for potentially defective pixels are compared to signals for pixels within local neighborhoods surrounding the potentially defective pixels.

16. The method of claim 15, wherein signals for potentially defective pixels satisfying a desired relationship to signals for pixels within a local neighborhood are not identified defective.

17. The method of claim 15, including the step of conditionally identifying pixels as defective based upon a comparison of signals representative of the pixels to desired parameter values, and wherein the local neighborhood comparison is performed only for pixels identified as conditionally defective.

18. The method of claim 10, including the step of comparing signals representative of pixels adjacent to defective pixels to one another and identifying adjacent pixels as defective when the signals differ from one another by more than a desired amount.

19. The method of claim 18, wherein the adjacent pixels are selected following a direction of read out of output signals from the detector.

20. A method for forming a digital x-ray image comprising the steps of:

(a) irradiating an object of interest with a stream of x-ray radiation so as to cause at portions of the radiation stream to impact a discrete pixel detector;

(b) generating image signals representative of radiation received within discrete pixel regions of the detector;

(c) accessing a mask of defective pixels, the mask being generated by analysis of series of dark and exposed images generated from test signals received by the detector compared to desired values derived from the test signals; and (d) processing the image signals at least in part based upon the mask to generate processed signals capable of being reconstructed into an image.

21. The method of claim 20, wherein the mask identifies defective pixels which produced inconsistent output signals through a series of dark images.

22. The method of claim 20, wherein the mask identifies defective pixels which produced output signals which deviated more than a desired amount from a reference value through a series of dark images.

23. The method of claim 20, wherein the mask identifies defective pixels which produced output signals which deviated more than a desired amount from a reference value through a series of exposed images.

24. The method of claim 20, wherein the mask identifies defective pixels which produced output signals which varied more than a desired amount from output signals of neighboring pixels through a series of exposed images.

25. The method of claim 20, wherein the step of processing the image signals includes disregarding output signals from pixels identified as defective in the mask.

26. A digital x-ray system adapted to identify defective pixels in a detector assembly, the system comprising:

an x-ray source;

an x-ray detector assembly, the detector assembly configured to generate output signals representative of radiation received in discrete pixel regions; and a signal processing circuit, the signal processing circuit being configured to receive output signals from the detector assembly during a dark image test sequence and an exposed image test sequence, to average output signals for each pixel region in each of the dark and exposed image test sequences, and to identify defective pixel regions in the detector assembly by statistical analysis of the average output signals as compared to desired levels derived from the output signals.

27. The system of claim 26, wherein the signal processing circuit is configured to create a defective pixel mask referencing pixels identified as defective in the dark and exposed image test sequences, and to access the pixel mask during processing of subsequent x-ray images.

28. The system of claim 26, wherein the signal processing circuit is configured to identify defective pixels which produce inconsistent output signals through a series of dark images in the dark image test sequence.

29. The system of claim 26, wherein the signal processing circuit is configured to identify defective pixels which produced output signals which deviate more than a desired amount from a reference value through a series of dark images in the dark image test sequence.

30. The system of claim 26, wherein the signal processing circuit is configured to identify defective pixels which produced output signals which deviate more than a desired amount from a reference value through a series of exposed images in the exposed image test sequence.

31. The system of claim 26, wherein the signal processing circuit is configured to identify defective pixels which produced output signals which vary more than a desired amount from output signals of neighboring pixels through a series of exposed images.

32. The method of claim 1, wherein steps (a) and (b) are performed before steps (c) and (d).

33. The method of claim 10, wherein step (a) is performed before step (b).

* * * * *